United States Patent [19]

Pernpeintner

[11] Patent Number: 4,945,274

[45] Date of Patent: Jul. 31, 1990

[54] ANGULAR PULSE GENERATOR WITH FLUX RETURN

[75] Inventor: Alfons Pernpeintner, Langguaid, Fed. Rep. of Germany

[73] Assignee: Siemens Aktiengesellschaft, Berlin and Munich, Fed. Rep. of Germany

[21] Appl. No.: 339,215

[22] Filed: Apr. 17, 1989

[30] Foreign Application Priority Data

May 16, 1988 [DE] Fed. Rep. of Germany ....... 3816642

[51] Int. Cl.$^5$ ................... G01B 7/30; H02K 19/30; H02P 9/00
[52] U.S. Cl. .................... 310/256; 310/170; 324/173; 336/135
[58] Field of Search ............... 310/68, 155, 171, 256, 310/268, 170; 322/29, 31; 324/173, 208; 336/84 M, 135

[56] References Cited

U.S. PATENT DOCUMENTS

| | | | |
|---|---|---|---|
| 3,980,913 | 9/1976 | Peterson | 310/155 |
| 4,024,458 | 5/1977 | Templin | 328/133 |
| 4,121,112 | 10/1978 | Hartig | 307/106 |
| 4,258,279 | 3/1981 | Hovorka | 310/155 |

FOREIGN PATENT DOCUMENTS

| | | |
|---|---|---|
| 0076982 | 4/1983 | European Pat. Off. . |
| 2532226 | 1/1977 | Fed. Rep. of Germany . |
| 2245930 | 4/1975 | France . |
| 59-65571 | 8/1984 | Japan . |

Primary Examiner—Mark O. Budd
Assistant Examiner—D. L. Rebsch
Attorney, Agent, or Firm—Hill, Van Santen, Steadman & Simpson

[57] ABSTRACT

In an angular pulse generator having a movable generator part and a read head, the read head has a primary winding (W1) fed with an alternating voltage of a defined frequency and has a secondary winding (W2) whose induced secondary voltage is modulated by passing teeth and intervening gaps of the generator part. An evaluation unit evaluates the phase difference between the alternating voltage and the secondary voltage and forms a pulse for every passing tooth. A stray flux return line surrounds the primary winding (W1), so that the majority part of the primary flux linked to the primary winding (W1) flows via the stray flux return line for a large gap distance of the generator part.

6 Claims, 1 Drawing Sheet

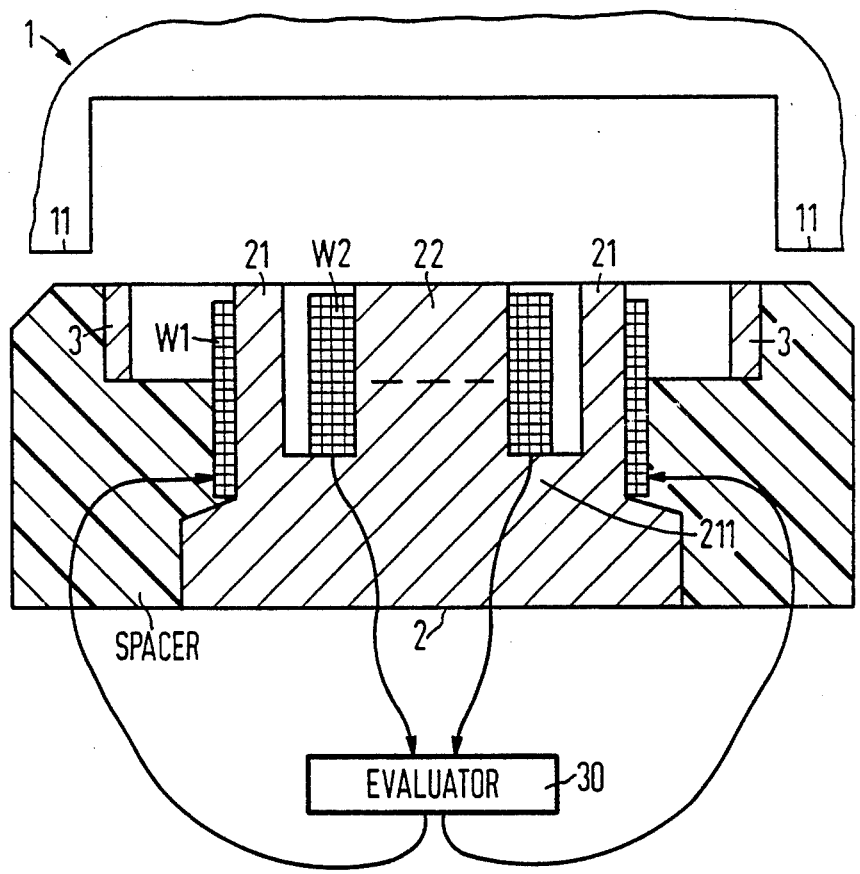

ANGULAR PULSE GENERATOR WITH FLUX RETURN

BACKGROUND OF THE INVENTION

The present invention is directed to an angular pulse generator.

A prior art angular pulse generator is disclosed in German Published Application 25 32 226. A read head is provided having a primary winding and a secondary winding. The primary winding is fed with an alternating voltage having a defined frequency, primary voltage, and secondary voltage is thereby induced in the secondary winding. An evaluator generates an output signal that is dependent on the phase difference between this secondary voltage and the primary voltage that is defined by the material and spacing of a generator part passing by. The generator part has markings, for example in the form of teeth, that have less of a distance from the read head when they pass by than do gaps lying therebetween. Accordingly, the output signal differs in magnitude for teeth and gaps, i.e. has a signal deviation.

The present invention is based on the determination that this signal deviation is dependent not only on the spacing between the teeth and the read head but is also particularly dependent on the relationship between the size of the gaps and the diameter of the read head. Previously to the present invention, a particular read head could only be used in combination with a generator part whose contours and dimensions could be varied only within narrow limits. For example, it was not possible to read a generator wheel having 60 teeth and a generator wheel having 24 teeth with the same read head and obtain usable results.

SUMMARY OF THE INVENTION

It is therefore an object of the present invention to provide an improved angular pulse generator such that a signal deviation adequate for discriminating between teeth and gaps of a generator part is essentially independent of the contour and dimensions of the generator part.

More specifically, the present invention is an angular pulse generator that reads at least one marking on a movable generator part and outputs a pulse when a marking passes by. The angular pulse generator has a read head with a hollow cylinder that is open at one side, thereby defining an opening, and that is closed at the other side by a floor and with a solid cylinder that is attached on the floor concentrically within the hollow cylinder, and with a secondary coil that is wound around the solid cylinder. An evaluation unit feeds the primary winding with an alternating voltage having a defined frequency at a primary voltage and evaluates the phase difference between the primary voltage and a secondary voltage that is induced in the secondary coil and modulated by the generator part and forms a pulse therefrom. The invention has a cylindrical stray flux return line outwardly coaxially surrounding at least one part of a half of the primary winding facing toward the opening. The stray flux return line has predetermined material, dimensions and arrangement such that a major part of a primary flux linked to the primary winding flows via the stray flux return line when the generator part is at a great distance from the read head. In a preferred embodiment the predetermined dimensions are such that the primary flux increases by a maximum of 20% for a passing of the generator part. The end faces of the stray flux return line, of the solid cylinder and of the hollow cylinder lie in a plane and the plane is aligned at a right angle relative to an axis of symmetry of the stray flux return line, the solid cylinder and the hollow cylinder. A radial distance between the stray flux return line and the primary coil is equal to or greater than a radial distance between the primary coil and the secondary winding.

The solution of the object of the present invention was made more difficult by the fact that no mathematical model is known that sets forth the relationships between the dimensions of the read head and those of the generator part. Tests merely show that the output signal corresponding to an excessively large gap becomes too high, resulting in a signal deviation that can no longer be reliably evaluated with respect to the output signal corresponding to a tooth.

The present invention is then based on the following clarification of the relationships in the known generator: As long as a gap of the generator part is situated over the read head, the coupling between the two windings is defined by the relatively unstable stray field between the end faces of a hollow cylinder and a solid cylinder; for example, a phase shift of 30° results which produces a relatively high output signal.

When a tooth then approaches the read head, a part of a stray field that is critical for the coupling of the tube winding is initially reduced since the tooth withdraws field lines from the flux circuit that couples the windings. The output signal, however, rises very sharply as soon as the tooth covers the hollow cylinder and reaches the solid cylinder. If one tracks the course of the output signal independently of the motion of the tooth across the read head, then one can see that this signal initially drops off from a high value to close to zero for the approach and then rises sharply again. This "unsteadiness point" makes it impossible to allocate a defined position of the tooth of the generator part to a defined amplitude of the output signal.

A stray flux return line of the present invention then varies the shape and size of the field coupling the two windings, for a gap of the generator part, such that the two windings are only coupled in a very weak fashion, a significantly low output signal resulting therefrom. For appropriate arrangement and design of the stray flux return line, this situation is only slightly modified for the approach of a tooth. The approach of the tooth, thus, does not effect any previously produced output signal; rather, this increases steadily with increasing approach of the tooth. An unambiguous allocation of the position of a tooth profile to the size of the output signal is also possible.

A further advantage of the stray flux return line is that the angular pulse generator is also insensitive to magnetically conductive material (for example, the motor block) that surrounds it. An angular pulse generator without stray flux return line must be specifically adapted to every configuration in which it is integrated since the surrounding material simulates a generator part at a certain distance dependent on the nature, quantity and spacial allocation thereof, so that a phase shift cannot return fully to zero when a gap of the generator part is read. The difference of the phase shift between the gap and the tooth becomes less and thus more difficult to evaluate. The stray flux return also protects the angular pulse generator against this undefined influencing so that the same phase shift of 0° when reading a gap of the generator part always results for different environmental conditions.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing in which:

The single figure shows a section through a read head of an angular pulse generator of the present invention.

DESCRIPTION OF THE PREFERRED EMBODIMENT

The single Figure shows a read head 2 of ferrite that reads a generator part 1 having teeth 11 and intervening gaps that pass by it. The core of the read head 2 is formed of a solid cylinder 22 having a diameter of 3 mm and of a hollow cylinder 21 coaxially surrounding the solid cylinder 22, having an inside diameter of 8 mm and a wall thickness of 1 mm; the two cylinders 21, 22 define an inside space that is closed at one side by a floor 211 and is open toward the generator part 1 on the other side.

The floor 211 also has a part with an enlarged diameter and thus forms a seating surface for a primary winding W1 wound around the hollow cylinder 21. A secondary winding W2 is wound around the solid cylinder 22. The ratio of the number of turns of the primary winding W1 and secondary winding W2 is equal to 18/198 in a preferred embodiment. The primary winding W1 is fed with an alternating voltage of 3 volts and a frequency of 100 kHz. A secondary voltage modulated by the passing generator part is taken at the secondary winding W2 and the phase difference thereof from the alternating voltage that generates it is evaluated by evaluating unit 30 according to the method disclosed in German Published Application 25 32 226. The winding referenced W3 therein has the same function as the winding W2 of the Figure.

A stray flux return 3 that angularly surrounds the primary winding W1 is held in position by a spacer and primary voltage, and a of plastic that is not electrically and magnetically conductive. The stray flux return 3 is composed of iron, has inside diameter of 12 mm, a thickness of 0.5 mm and a length of 2 mm.

In the situation shown in the Figure, a gap of the generator part 1 is just located opposite the read head 2. The distance between the read head 2 and the generator part 1 is thus large and the magnetic coupling between the windings is correspondingly slight. A stray flux linked to the primary winding is therefore high. The stray flux return 3 forms a return path having low resistance for the flux and is located such that the magnetic resistance of the circuit changes only slightly depending on the distance thereof from the teeth or from any disturbing particles. Moreover, the eddy currents in the "shield" effect a defined magnetic load of the core, as a result whereof the phase difference that would be approximately 30° without the stray flux return 3 again becomes approximately zero.

In the exemplary embodiment of the Figure, this effect is achieved by a stray flux return 3 composed of the aforementioned material and having the aforementioned dimensions. Angular pulse generators having different dimensionings or other magnetic and electrical data also require an adaptation of the stray flux return 3.

The stray flux return 3 must be designed such that the major part of the stray flux occurring due to a great distance between the generator part 1 and the read head 2 is bound via the stray flux return 3. However, a resulting defined magnetic loading of the core must remain so low that the magnetic resistance for the main flux linked to the two windings increases to a significantly greater extent due to the tooth 11 of the generator part 1 passing by the read head 2 than does the stray flux via the stray flux return.

The dimensioning of the stray flux return 3 required for an angular pulse generator is identified by testing. As set forth above, the effect of this stray flux return 3 can not be excessively large since it would otherwise greatly attenuate the angular pulse generator. It is mainly three influencing factors that are critical for the effect of the stray flux return 3: the nature of the material, the quantity of material and the distance from the primary coil W1. The magnetic effect of the stray flux return 3 becomes more significant for higher eddy current losses of the material used, as more material is used, and as distance of the stray flux return 3 from the primary coil W1 becomes smaller. It is therefore particularly beneficial that the radial distance between the stray flux return 3 and the primary coil W1 is greater than the distance between the primary coil W1 and the secondary coil W2. The stray flux return 3, for example, could be replaced by a low retentivity housing whose inside diameter amounts to 17mm. The intensified effect of such a stray flux return due to the greater quantity of material is thereby in turn compensated by the lower eddy current losses and by the greater distance from the primary coil W1.

The stray flux return 3 should not project beyond the end face of the head 2 in an axial direction, i.e. in the direction toward the generator part 1, since the angular pulse generator would otherwise be greatly attenuated. The end faces of stray flux return 3, of the solid cylinder 22 and the hollow cylinder 21 preferably lie in the same plane that is aligned at a right angle relative to an axis of symmetry.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An angular pulse generator that reads at least one marking on a movable generator part and outputs a pulse when a marking passes by, having a read head with a hollow cylinder that is open at one side, thereby defining an opening, and that is closed at the other side by a floor and with a solid cylinder that is attached on the floor concentrically within the hollow cylinder, and with a primary coil that is wound around the hollow cylinder and a secondary coil that is wound around the solid cylinder, and having an evaluation unit that feeds the primary winding with an alternating voltage having a defined frequency at a primary voltage and that evaluates the phase difference between the primary voltage and a secondary voltage that is induced in the secondary coil and modulated by the generator part and that forms a pulse therefrom, comprising:

a cylindrical stray flux return line outwardly coaxially surrounding at least one part of a half of the primary winding facing toward the opening; and the stray flux return line having predetermined material, dimensions and arrangement such that a major part of a primary flux linked to the primary winding flows via the stray flux return line when the generator part is at a great distance from the read head.

2. The angular pulse generator according to claim 1, wherein the predetermined dimensions are such that the primary flux increases by a maximum of 20% for a passing of the generator part.

3. The angular pulse generator according to claim 2, wherein end faces of the stray flux return, of the solid cylinder and of the hollow cylinder lie in a plane and the plane is aligned at a right angle relative, to an axis of symmetry of the stray flux return line, the solid cylinder and the hollow cylinder.

4. The angular pulse generator according to claim 3, wherein a radial distance between the stray flux return line and the primary coil is equal to or greater than a radial distance between the primary coil and the secondary winding.

5. An angular pulse generator that reads at least one marking on a movable generator part and outputs a pulse when a marking passes by, having a read head with a hollow cylinder that is open at one side, thereby defining an opening, and that is closed at the other side by a floor and with a solid cylinder that is attached on the floor concentrically within the hollow cylinder, and with a primary coil that is wound around the hollow cylinder and a secondary coil that is wound around the solid cylinder, and having an evaluation unit that feeds the primary winding with an alternating voltage having a defined frequency at a primary voltage and that evaluates the phase difference between the primary voltage and a secondary voltage that is induced in the secondary coil and modulated by the generator part and that forms a pulse therefrom, comprising:

a cylindrical stray flux return line outwardly coaxially surrounding at least one part of a half of the primary winding facing toward the opening; and the stray flux return line having predetermined material, dimensions and arrangement such that a major part of a secondary flux linked to the primary winding flows via the stray flux return line when the generator part is at a great distance from the read head; end faces of the stray flux return line, of the solid cylinder and of the hollow cylinder lying in a plane and the plane being aligned at a right angle relative to an axis of symmetry of the stray flux return line, the solid cylinder and the hollow cylinder; and a radial distance between the stray flux return line and the primary coil being equal to or greater than a radial distance between the primary coil and the secondary winding.

6. The angular pulse generator according to claim 5, wherein the predetermined dimensions are such that the primary flux increases by a maximum of 20% for a passing of the generator part.

* * * * *